(12) United States Patent
Stucker et al.

(10) Patent No.: US 8,594,296 B2
(45) Date of Patent: Nov. 26, 2013

(54) MULTIMODAL CALLBACK TAGGING

(75) Inventors: Brian Stucker, Redmond, WA (US);
Rajesh Ramanathan, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 853 days.

(21) Appl. No.: 12/469,538

(22) Filed: May 20, 2009

(65) Prior Publication Data

US 2010/0296640 A1 Nov. 25, 2010

(51) Int. Cl.
*H04M 3/42* (2006.01)
(52) U.S. Cl.
USPC .......... 379/210.01; 370/259; 379/88.17; 379/98.01; 379/201.01; 379/201.1; 379/209.01; 709/202; 709/203; 709/228
(58) Field of Classification Search
USPC .......... 348/14.01–14.16; 370/259–271, 370/351–356; 455/426.1, 426.2, 455/456.1–466, 550.1–560, 412.1–420, 455/575.1–575.9, 90.1–90.3; 704/270–278; 709/201–207, 217–248; 340/5.8, 5.81, 340/5.82, 5.83, 5.84, 5.85, 5.86; 379/67.1–88.28, 92.01–93.04, 379/106.01–106.03, 114.14, 379/142.01–142.18, 201.01, 379/201.06–201.11, 208.01–218.02, 379/265.01–266.1
See application file for complete search history.

(56) References Cited

U.S. PATENT DOCUMENTS

| | | | |
|---|---|---|---|
| 6,081,725 A * | 6/2000 | Ishida | 455/462 |
| 6,212,268 B1 * | 4/2001 | Nielsen | 379/210.01 |
| 6,782,412 B2 * | 8/2004 | Brophy et al. | 709/204 |
| 6,792,094 B1 * | 9/2004 | Kirkpatrick | 379/209.01 |
| 6,970,547 B2 * | 11/2005 | Andrews et al. | 379/210.01 |
| 6,999,572 B1 * | 2/2006 | Shaffer et al. | 379/210.01 |
| 7,003,305 B2 * | 2/2006 | Urs | 455/466 |
| 7,065,197 B1 * | 6/2006 | Ramella-Pezza et al. | 379/201.02 |
| 7,076,043 B2 * | 7/2006 | Curbow et al. | 379/201.06 |
| 7,216,350 B2 * | 5/2007 | Martin et al. | 719/315 |
| 7,233,655 B2 * | 6/2007 | Gailey et al. | 379/210.01 |
| 7,356,307 B1 * | 4/2008 | Parker | 455/41.2 |
| 7,359,496 B2 * | 4/2008 | Qian et al. | 379/201.07 |
| 7,515,904 B2 * | 4/2009 | Okon et al. | 455/414.1 |
| 7,573,996 B1 * | 8/2009 | Somani | 379/210.01 |
| 7,813,489 B2 * | 10/2010 | Dezonno | 379/210.01 |
| 7,817,620 B1 * | 10/2010 | Jones et al. | 370/352 |
| 2003/0112948 A1 * | 6/2003 | Brown et al. | 379/207.04 |
| 2003/0112952 A1 * | 6/2003 | Brown et al. | 379/211.01 |
| 2003/0179743 A1 * | 9/2003 | Bosik et al. | 370/352 |

(Continued)

FOREIGN PATENT DOCUMENTS

WO 2005004451 A1 1/2005

OTHER PUBLICATIONS

Jouve, et al., "A SIP-based Programming Framework for Advanced Telephony Applications", retrieved at <<http://phoenix.labri.fr/publications/papers/jouve-al_iptcomm08.pdf>>, pp. 1-21.

*Primary Examiner* — Hemant Patel
(74) *Attorney, Agent, or Firm* — Turk IP Law, LLC

(57) ABSTRACT

Users in an enhanced communication system are enabled to tag other users so that the tagging user is notified when both the tagged and tagging users meet a predefined criterion of presence states and/or available modalities to the tagging and the tagged users. The tagging user may then, optionally, initiate a multimodal session with the tagged user utilizing the set of modalities originally specified or another set.

17 Claims, 7 Drawing Sheets

(56) References Cited

U.S. PATENT DOCUMENTS

| | | | |
|---|---|---|---|
| 2003/0187944 A1* | 10/2003 | Johnson et al. | 709/209 |
| 2004/0037396 A1* | 2/2004 | Gray et al. | 379/67.1 |
| 2004/0161090 A1* | 8/2004 | Digate et al. | 379/202.01 |
| 2004/0199580 A1* | 10/2004 | Zhakov et al. | 709/204 |
| 2004/0240642 A1* | 12/2004 | Crandell et al. | 379/88.22 |
| 2005/0243990 A1* | 11/2005 | Vonk | 379/210.01 |
| 2007/0147596 A1* | 6/2007 | Moser | 379/207.02 |
| 2007/0165841 A1* | 7/2007 | Faber et al. | 379/441 |
| 2007/0201646 A1* | 8/2007 | Metcalf | 379/142.01 |
| 2008/0080699 A1 | 4/2008 | Skubnik et al. | |
| 2008/0249778 A1* | 10/2008 | Barton et al. | 704/270 |
| 2008/0317232 A1* | 12/2008 | Couse et al. | 379/210.01 |
| 2009/0043856 A1* | 2/2009 | Darby | 709/206 |
| 2009/0138552 A1* | 5/2009 | Johnson et al. | 709/204 |

* cited by examiner

MULTIMODAL CALLBACK TAGGING

BACKGROUND

Automatic call ring back is a feature of conventional phone systems, but it only relates to voice communications and does not take into account the potentially shifting capabilities of both users involved. A user who wishes to reach another user and finds them busy after attempting a call in a phone system may enter a special code that tells the central office to watch the called party. The calling party then hangs up. When the called party is no longer on the phone, the central office automatically rings the original calling party and completes the call when the calling party picks up the handset.

Modern communication systems have a large number of capabilities including integration of various communication modalities with different services. For example, instant messaging, voice/video communications, data/application sharing, white-boarding, and other forms of communication may be combined with presence and availability information of subscribers. Such systems may provide subscribers with the enhanced capabilities such as providing instructions to callers for various status categories, alternate contacts, calendar information, and comparable features.

When a subscriber of an enhanced communication system with above described capabilities wishes to enter into a multimodal communication session with another party, the other party may not be available for one or more of the modalities or not have the capability to accommodate one or more of the requested modalities at all. Furthermore, the party being contacted may not realize that they have someone waiting to contact them.

SUMMARY

This summary is provided to introduce a selection of concepts in a simplified form that are further described below in the Detailed Description. This summary is not intended to exclusively identify key features or essential features of the claimed subject matter, nor is it intended as an aid in determining the scope of the claimed subject matter.

Embodiments are directed to enabling a user to tag another user so that the tagging user is notified when both the tagged and tagging users meet a predefined criterion of presence states and/or available modalities. When this occurs, the tagging user may be notified on some or all of their communication devices that meet the originally specified criteria. The tagging user may then, optionally, initiate a session with the tagged user utilizing the set of modalities originally specified or another set.

These and other features and advantages will be apparent from a reading of the following detailed description and a review of the associated drawings. It is to be understood that both the foregoing general description and the following detailed description are explanatory and do not restrict aspects as claimed.

DETAILED DESCRIPTION

Figure 1:
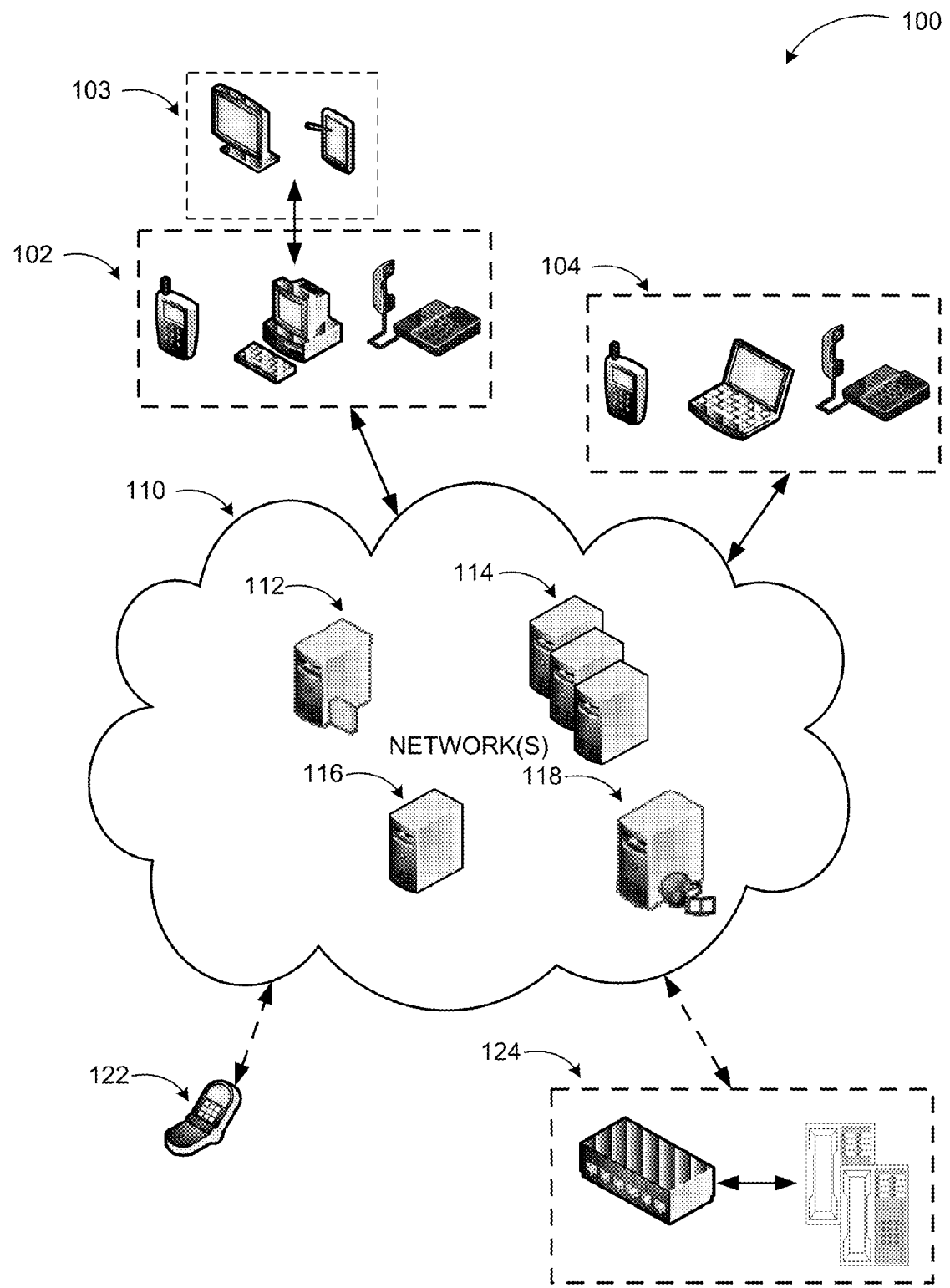
FIG. 1 is a diagram illustrating an example unified communications system, where embodiments may be implemented for multimodal callback tagging.

As briefly described above, subscribers of an enhanced communication system such as a unified communication system may be enabled to tag another subscriber for a multimodal communication session such that the session can be initiated when presence states and/or capabilities of both subscribers match the requested session parameters. In the following detailed description, references are made to the accompanying drawings that form a part hereof, and in which are shown by way of illustrations specific embodiments or examples. These aspects may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

While the embodiments will be described in the general context of program modules that execute in conjunction with an application program that runs on an operating system on a personal computer, those skilled in the art will recognize that aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multiprocessor systems, microprocessor-based or programmable consumer electronics, minicomputers, mainframe computers, and comparable computing devices. Embodiments may also be practiced in distributed computing environments where tasks are performed by remote processing devices that are linked through a communications network. In a distributed computing environment, program modules may be located in both local and remote memory storage devices.

Embodiments may be implemented as a computer-implemented process (method), a computing system, or as an article of manufacture, such as a computer program product or computer readable media. The computer program product may be a computer storage medium readable by a computer system and encoding a computer program that comprises instructions for causing a computer or computing system to perform example process(es). The computer-readable storage medium can for example be implemented via one or more of a volatile computer memory, a non-volatile memory, a hard drive, a flash drive, a floppy disk, or a compact disk, and comparable media.

Throughout this specification, the term "server" generally refers to a computing device executing one or more software programs typically in a networked environment. However, a server may also be implemented as a virtual server (software programs) executed on one or more computing devices viewed as a server on the network. More detail on these technologies and example operations is provided below.

Referring to FIG. 1, diagram 100 of an example unified communications system, where embodiments may be practiced, is illustrated. A unified communication system is an example of modern communication systems with a wide range of capabilities and services that can be provided to subscribers. A unified communication system is a real-time communications system facilitating instant messaging, presence, audio-video conferencing, web conferencing functionality, and comparable capabilities.

In a unified communication ("UC") system such as the one shown in diagram 100, users may communicate via a variety of end devices (102, 104), which are client devices of the UC system. Each client device may be capable of executing one or more communication applications for voice communication, video communication, instant messaging, application sharing, data sharing, and the like. For some of the advanced communication modes, the end devices may be used in conjunction with peripheral devices 103 such as external monitors, speakers, microphones, and similar ones. In addition to their advanced functionality, the end devices may also facilitate traditional phone calls through an external connection such as through PBX 124 to a Public Switched Telephone Network ("PSTN"). End devices may include any type of smart phone, cellular phone, any computing device executing a communication application, a smart automobile console, and advanced phone devices with additional functionality. Moreover, a subscriber of the UC system may use more than one end device and/or communication application for facilitating various modes of communication with other subscribers. End devices may also include various peripherals coupled to the end devices through wired or wireless means (e.g. USB connection, Bluetooth® connection, etc.) to facilitate different aspects of the communication.

UC Network(s) 110 includes a number of servers performing different tasks. For example, UC servers 114 provide registration, presence, and routing functionalities. Presence functionality enables the system to route calls to a user to anyone of the client devices assigned to the user based on default and/or user set policies. For example, if the user is not available through a regular phone, the call may be forwarded to the user's cellular phone, and if that is not answering a number of voicemail options may be utilized. Since the end devices can handle additional communication modes, UC servers 114 may provide access to these additional communication modes (e.g. instant messaging, video communication, etc.) through access server 112. Access server 112 resides in a perimeter network and enables connectivity through UC network(s) 110 with other users in one of the additional communication modes. UC servers 114 may include servers that perform combinations of the above described functionalities or specialized servers that only provide a particular functionality. For example, home servers providing presence functionality, routing servers providing routing functionality, rights management servers, and so on. Similarly, access server 112 may provide multiple functionalities such as firewall protection and connectivity, or only specific functionalities.

Audio/Video (A/V) conferencing server 118 provides audio and/or video conferencing capabilities by facilitating those over an internal or external network. Mediation server 116 mediates signaling and media to and from other types of networks such as a PSTN or a cellular network (e.g. calls through PBX 124 or from cellular phone 122). Mediation server 116 may also act as a Session Initiation Protocol (SIP) user agent.

In a UC system, users may have one or more identities, which is not necessarily limited to a phone number. The identity may take any form depending on the integrated networks, such as a telephone number, a Session Initiation Protocol (SIP) Uniform Resource Identifier (URI), or any other identifier. While any protocol may be used in a UC system, SIP is a commonly used method.

SIP is an application-layer control (signaling) protocol for creating, modifying, and terminating sessions with one or more participants. It can be used to create two-party, multiparty, or multicast sessions that include Internet telephone calls, multimedia distribution, and multimedia conferences. SIP is designed to be independent of the underlying transport layer.

SIP clients may use Transport Control Protocol ("TCP") to connect to SIP servers and other SIP endpoints. SIP is primarily used in setting up and tearing down voice or video calls. However, it can be used in any application where session initiation is a requirement. These include event subscription and notification, terminal mobility, and so on. Voice and/or video communications are typically done over separate session protocols, typically Real-time Transport Protocol ("RTP").

A conversation as used herein refers to a multimodal communication session, where subscribers may communicate over a plurality of devices, applications, and communication modes simultaneously or sequentially. For example, two subscribers may initiate a conversation by exchanging instant messages through their desktop computers. Later, the communication may be elevated to audio and instant message with one subscriber utilizing their desktop for both modes, while the other uses the desktop computer for instant messaging and a smart phone device for the audio mode. Other subscribers may join or leave the conversation other modes and devices may be added or removed. The commonality between these communications is preserved by designating all these communications as belonging to the same conversation. Conversations may be assigned a unique identifier, which enables subscribers to view, record, modify, share, and generally manage aspects of the conversation including documents and other data associated with the conversation (e.g. documents exchanged as attachments in one mode of the conversation or recordings of other modes of the conversation).

Presence functionality further enables subscribers to plan, establish, and modify their communication behavior based on other subscribers' attributes. For example, a status of a subscriber (e.g. available, busy, out of office, etc.), a location of a subscriber, communication capabilities of a subscriber (available end devices, network capabilities, etc.), and a number of other factors may be published for each subscriber under their presence information enabling others to adjust their communication behavior accordingly.

While the example system in FIG. 1 has been described with specific components such as mediation server, A/V server, and similar devices, embodiments are not limited to this system of the example components and configurations. An enhanced communication system facilitating multimodal callback tagging capability may be implemented in other systems and configurations employing fewer or additional components. Furthermore, such systems do not have to be enhanced communication systems integrating various communication modes. Embodiments may also be implemented in systems facilitating different communication modes distinctly by coordinating implementation of the rules across different communication modes using the principles described herein.

Figure 2:
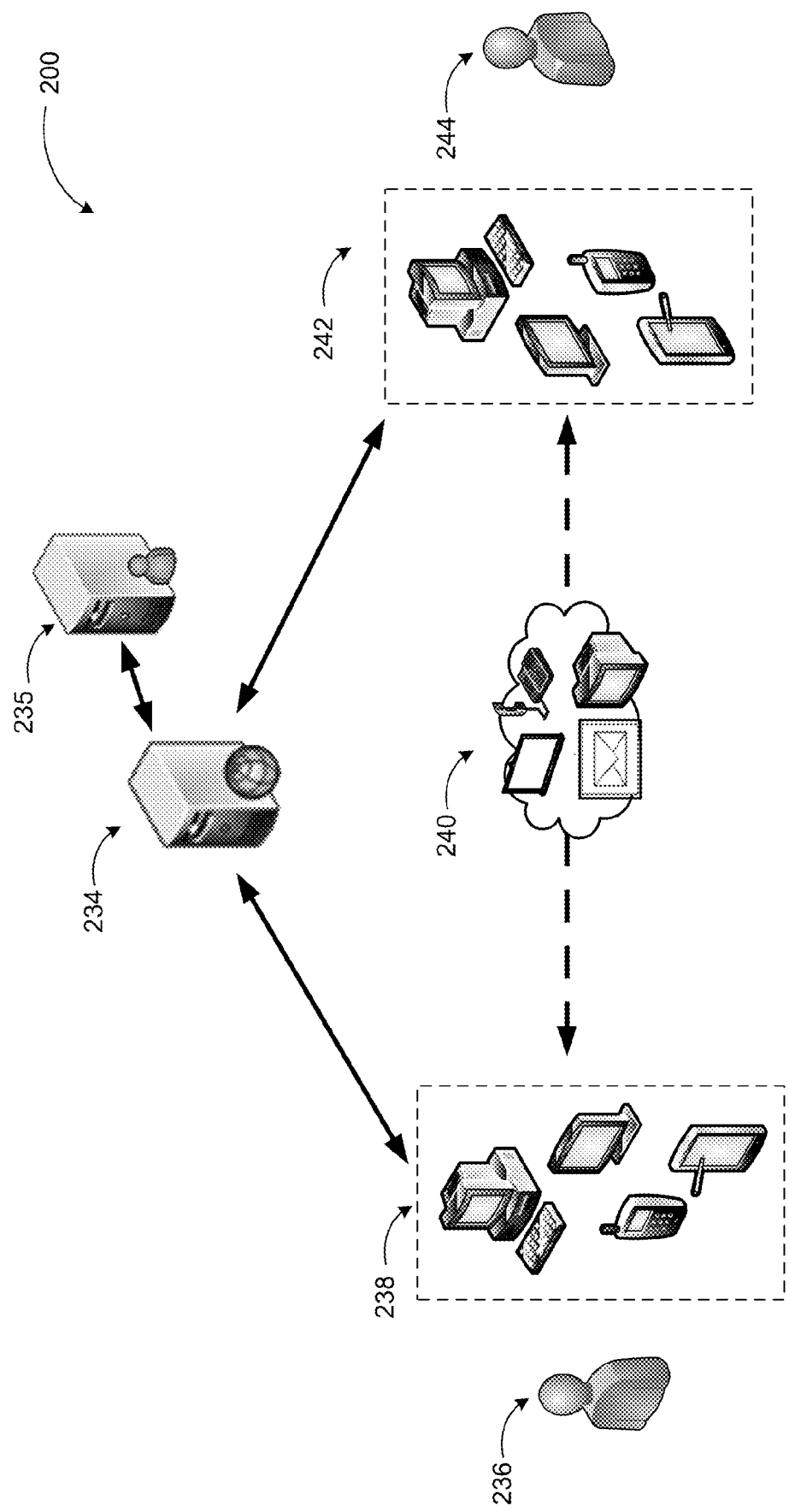
FIG. 2 is a conceptual diagram illustrating a basic example system for facilitating a multimodal callback tagging.

FIG. 2 is a conceptual diagram illustrating a basic example system for facilitating multimodal callback tagging. While a system according to embodiments is likely to include a number of servers, client devices, and services such as those illustratively discussed in FIG. 1, only those relevant to embodiments are shown in diagram 200 of FIG. 2.

The challenge of wishing to reach someone when they become available is a long-standing challenge. Presence tagging is a feature that may be implemented on presence clients. With this feature one can tag a user in their contact list so that they are notified when the tagged user are in a certain state. However, there is no notion of what modalities one may wish to engage in once the other user is in the desired presence state. In conventional systems, the presence state is used in the calculation of when to notify the tagging user that the tagged user is in the desired state.

Presence pounce is a capability on some text messaging clients that allows a user to queue a short text message and tie that to a trigger that is dependent upon someone else's presence state meeting a given criteria. For example, a user may wish to have their text message client automatically send "call me a 425-555-1212" to another user the moment they are online. This feature lacks the negotiation aspect. It is a simple text messaging automation script, but one that gives the other party an indication that someone is waiting for them.

A system according to embodiments addresses presence and capabilities of client device/applications that the tagging and tagged users are interacting with and a set of desired capabilities/modalities selected by the tagging user at the time of tagging the other user.

In an enhanced communication system such as a unified communication system, subscribers (e.g. user 236, 244) may facilitate multimodal communications 240 employing one or more end devices (e.g. 238, 242) and associated peripherals. Multimodal communication 240 may include audio, video, file sharing, desktop sharing, instant messaging, electronic mail, white boarding, and similar forms of communication. The conversation may be established and managed by one or more servers in a distributed fashion (e.g. UC server 234 and presence server 235).

In an example scenario according to embodiments, when user 236 wishes to communicate with user 244, user 236 creates one or more notification criteria including the presence state and desired set of modalities that user 236 would like to use when communicating with user 244. User 244's presence is then monitored such that when user 236 matches the desired presence state on a device that indicates it is capable of the modalities requested, user 244 will trigger a notification. Furthermore, user 244 may optionally use own presence and capability information across the set of devices user 244 is logged into (242) to determine when user 244 is using a client that matches the desired capability set before notifying the user of user 236's availability.

For example, user 236 may wish to have an audio communication and an application sharing session with user 244, who is currently busy. User 236 tags user 244 such that user 236 is notified when user 244 is available on a device that is capable of audio communication and application sharing. User 244 may have two client devices one which is capable only of audio and the other is capable of audio and application sharing. User 244 may be actively engaged in a call on his/her audio-only device, and the other device may be in an inactive state. When user 244 ends the call on the audio only device, they do not yet meet the notification criteria established by user 236: they are not available at a device which has application sharing. If user 236 were to initiate a session with user 244, they may not be able to engage in the desired application sharing session. When user 244 begins interacting with the client device that is capable of audio communication and application sharing, their presence is updated to reflect this. At that point, user 236 defined criteria are met and the user is notified, so that he/she can initiate the multimodal communication session.

Optionally, user 236 may also have asked that they be notified when they are also available at a client device of their own that is capable of audio communication and application sharing, thus delaying the notification when both parties mutually meet the criteria. Moreover, user 244 may be provided a notification that user 236 wishes to communicate with them using audio communication and application sharing at the device that does not support this combination to expedite their moving to a client device that does support the desired modalities.

Monitoring of the user(s)'s presence states, communication capabilities based on the predefined criteria may be performed by the user(s)'s endpoints or by servers of the enhanced communication system. For example, UC server 234 may receive the tagging request from user 236, request presence status of user 244 from presence server 235, and monitor active end devices of user 244 along with that user's presence status until a match is established based on user 236's criteria.

Of course, these functionalities may also be performed by other devices in the system such as multipurpose servers, dedicated servers, and comparable ones in a centralized or distributed fashion. The communication modes discussed above do not constitute a limitation on embodiments. Any communication modality may be employed in implementing a callback tagging feature according to embodiments.

Participants in a multimodal conversation such as the one shown in diagram 200 may be part of the same network (e.g. an enterprise network), connected through different networks (e.g. in a federated environment), or communicate via a combination of secure and unsecure networks such as the Internet. Appropriate security measures such as personal identification numbers, passwords, and comparable ones may be employed to ensure privacy and security of the conversation in conjunction with the callback tagging feature. For example, a user's location may be indicated as private and not shared with the tagging user.

Figure 3:
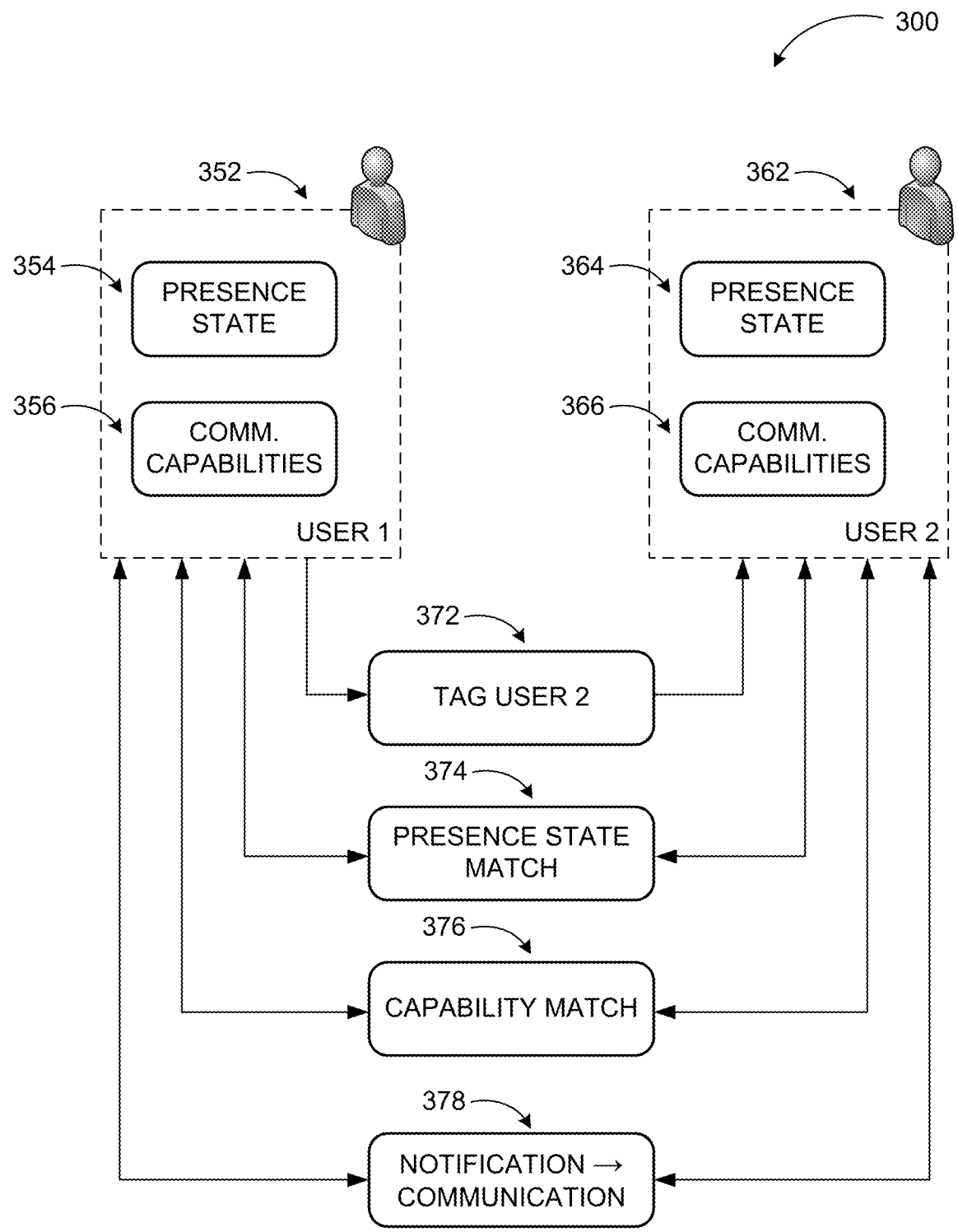
FIG. 3 illustrates major components and actions in an enhanced communication system for facilitating multimodal callback tagging according to embodiments.

FIG. 3 is diagram 300 illustrating major components and actions in an enhanced communication system for facilitating multimodal callback tagging according to embodiments.

Users 352 and 362 are subscribers of an enhanced communication system such as a unified communication system. As such, users 352 and 362 may employ multiple end devices and/or applications with different communication capabilities 356, 366 such as those described above. Some or all of the communications capabilities may be active at any given time. For example, user 352 may employ a communication application on his/her desktop computer capable of audio, video, and application sharing, a handheld computer with text messaging capability, and a phone device with audio only capability. One or more of these devices/applications may be turned off at some point. Thus, communication capability of each user is a variable parameter.

Another aspect associated with enhanced communication is presence state 354, 364 of the users 352 and 362. Presence state may include availability of each user (e.g. available, busy, offline, on vacation, etc.), but may also go beyond availability. For example, the users' location, mobile status, and other attributes may be part of their presence state.

As discussed above, callback tagging operations in a system according to embodiments begin with a user (e.g. User 1)

defining one or more criteria for a desired communication session with another user (e.g. User 2) and tagging that user (372). The tag request may be received and processed by a server of the system and the tag may contain information associated with the desired communication session such as subject matter, link(s) to related documents, websites, reference information, and comparable data.

Next, presence state and current communication capabilities of the tagged user may be determined (and monitored if there is no match) (374, 376). The tagged user may also be provided a notification that User 1 is requesting a multimodal communication session, which may affect User 2's behavior. The notification may be in a variety of forms (e.g. instant message, email, audio alert, visual alert, SIP notification, etc.). The notification may also include the additional information mentioned above that may be contained in the tag. Moreover, the notification may be constrained based on the tagging and/or tagged user's presence state.

Upon determining a match between the User 1 defined presence state and communication capabilities for User 2 and the actual ones, User 1 may be notified that the desired communication session can be established. Alternatively, the session may be established automatically (if both users' presence states and communication capabilities match) by sending invite messages to the users.

User 1 and User 2 may not only be within an enterprise, but outside the enterprise such as in a federated environment, or even behind a SIP trunk. The users may be able to authenticate themselves to request the callback tagging or to initiate the desired communication session using, for example, a shared corporate identifier that authenticates the user against a directory service. Furthermore, User 1 may tag a plurality of users for a multimodal communication session, in which case all tagged users' presence states and communication capabilities may be monitored to determine a match and notify User 1.

A system according to embodiments may also compute a likelihood of match between the desired and current presence states and communication capabilities. Then, based on the likelihood of match, the system may determine a likelihood of establishing the requested multimodal communication session and notify the tagging user.

The above discussed scenarios, example systems, conversation modalities, and configurations are for illustration purposes. Embodiments are not restricted to those examples. Other forms of notifications, configurations, communication modes, and scenarios may be used in implementing multimodal conversations with callback tagging capability in a similar manner using the principles described herein.

Figure 4:
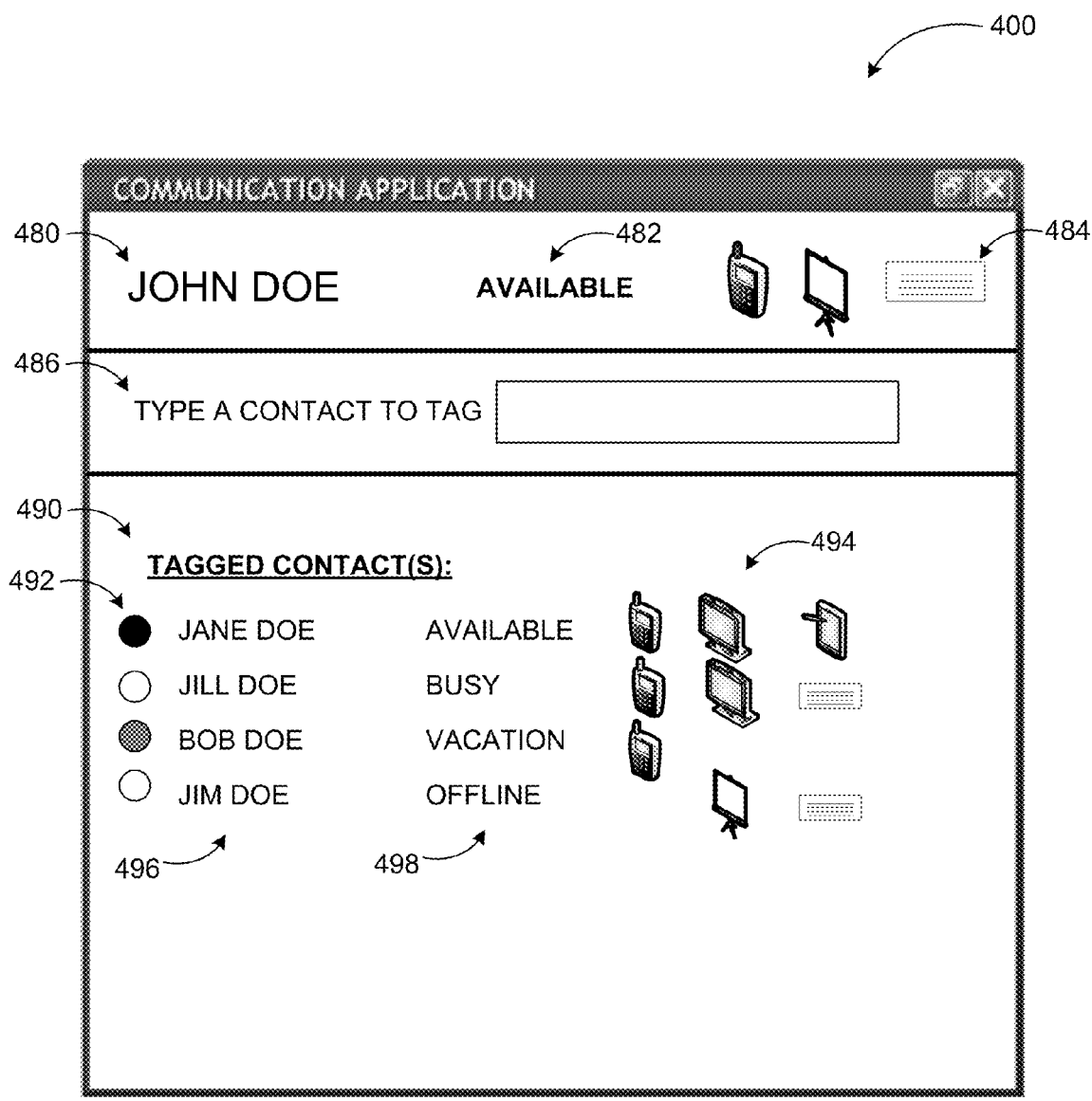
FIG. 4 is an example communication application user interface with callback tagging features in a system according to embodiments.

FIG. 4 is an example communication application user interface with callback tagging features according to embodiments. User interfaces of communication applications facilitating multimodal communications may include a number of graphic and/or textual elements to provide users information and enable them to make selections. User interface 400 illustrates example elements associated with callback tagging.

The example user interface may include the user's identification 480 and presence status 482, as well as available communication modalities 484 (e.g. audio, application sharing, and text messaging). Another portion of the example user interface 400 includes an input box for the user to enter a contact for tagging (486). Tagged contacts 490 may be listed (496) with their current presence status 498 and their available communication modes 494. The presence status of the tagged contact may also be displayed in graphic form (492).

The listing of the tagged contacts and their attributes may also be used to enable the user (e.g. John Doe) to define desired presence status and communication modalities for the planned communication session. For example, the presence status listing may include drop down menus for each tagged user such that the tagging user can select the desired status. The user may also be enabled to select desired communication modalities by clicking on the available modality icons for each tagged user. User interface 400 may display the current status of the tagged users along with the desired status and availability employing a graphic, color, shading, or similar scheme.

A user interface for an enhanced communication application with callback tagging capability may include additional or fewer textual and graphical elements, and may employ various graphical, color, and other configuration schemes to display different functionalities. Other notification methods such as those described above may also be employed with additional or fewer elements as discussed herein.

Figure 5:
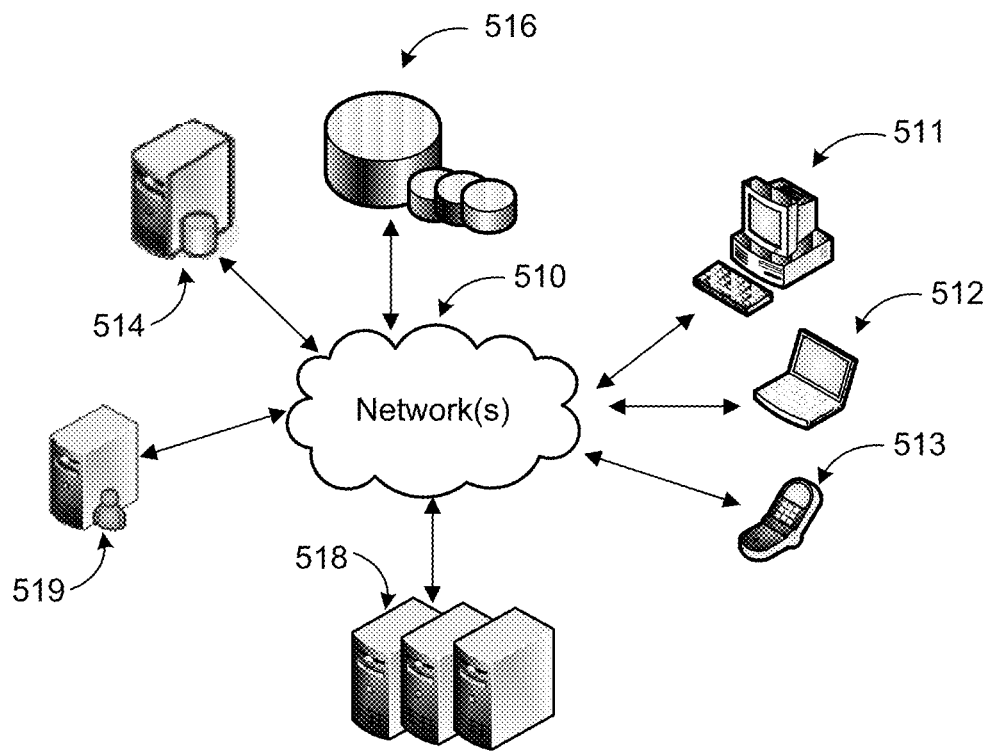
FIG. 5 is a networked environment, where a system according to embodiments may be implemented.

FIG. 5 is an example networked environment, where embodiments may be implemented. An enhanced communication system providing communication services including multimodal callback tagging capability may be implemented via software executed over one or more servers 518 such as a hosted service. The system may facilitate communications between client applications on individual computing devices such as a smart phone 513, a laptop computer 512, and desktop computer 511 ('client devices') through network(s) 510.

As discussed above, modern communication technologies such as UC services enable subscribers to utilize a wide range of computing device and application capabilities in conjunction with communication services. This means, a subscriber may use one or more devices (e.g. a regular phone, a smart phone, a computer, a smart automobile console, etc.) to facilitate communications. Depending on the capabilities of each device and applications available on each device, additional services and communication modes may be enabled.

Client devices 511-513 are used to facilitate communications through a variety of modes between subscribers of the communication system. One or more of the servers 518 may be used to monitor presence status of tagged users and notify tagging users when presence status and communication modality capabilities match the requested communication session attributes. Presence information may be stored by and retrieved from presence server 519. Information associated with subscribers and facilitating multimodal conversations, as well as callback tagging criteria, may be stored in one or more data stores (e.g. data store 516), which may be managed by any one of the servers 518 or by database server 514.

Network(s) 510 may comprise any topology of servers, clients, Internet service providers, and communication media. A system according to embodiments may have a static or dynamic topology. Network(s) 510 may include a secure network such as an enterprise network, an unsecure network such as a wireless open network, or the Internet. Network(s) 510 may also coordinate communication over other networks such as PSTN or cellular networks. Network(s) 510 provides communication between the nodes described herein. By way of example, and not limitation, network(s) 510 may include wireless media such as acoustic, RF, infrared and other wireless media.

Many other configurations of computing devices, applications, data sources, and data distribution systems may be employed to implement a communication system with multimodal callback tagging. Furthermore, the networked environments discussed in FIG. 5 are for illustration purposes only. Embodiments are not limited to the example applications, modules, or processes.

Figure 6:
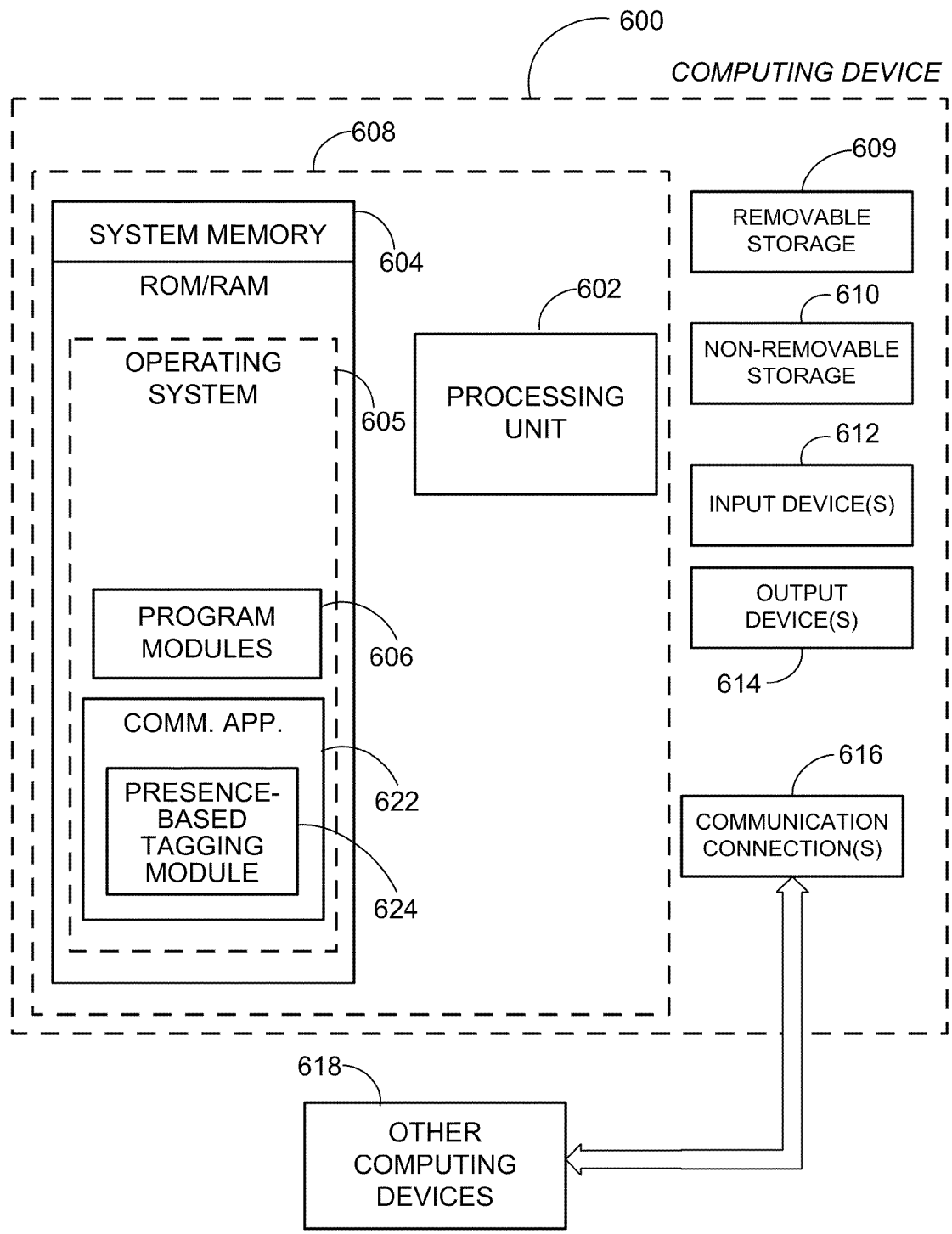
FIG. 6 is a block diagram of an example computing operating environment, where embodiments may be implemented.

FIG. 6 and the associated discussion are intended to provide a brief, general description of a suitable computing environment in which embodiments may be implemented. With reference to FIG. 6, a block diagram of an example computing operating environment for an application according to embodiments is illustrated, such as computing device 600. In a basic configuration, computing device 600 may be a server as part of an enhanced communication system and include at least one processing unit 602 and system memory 604. Computing device 600 may also include a plurality of processing units that cooperate in executing programs. Depending on the exact configuration and type of computing device, the system memory 604 may be volatile (such as RAM), non-volatile (such as ROM, flash memory, etc.) or some combination of the two. System memory 604 typically includes an operating system 605 suitable for controlling the operation of the platform, such as the WINDOWS® operating systems from MICROSOFT CORPORATION of Redmond, Wash. The system memory 604 may also include one or more software applications such as program modules 606, communication application 622, and presence based callback tagging module 624.

Communication application 622 may be part of a service that facilitates communication through various modalities between client applications, servers, and other devices. Presence based callback tagging module 624 may enable client applications to tag other users' client applications for a multimodal communication session, monitor the tagged user(s)'s presence status and communication capabilities, and notify the tagging user once a match with the original criteria is established. Presence based callback tagging module 624 may coordinate the notification with other applications such as an electronic mail application, an instant message application, and similar ones. This basic configuration is illustrated in FIG. 6 by those components within dashed line 608. In a system according to embodiments, the current presence state and the current set of communication capabilities of the other user may be monitored and the match determined also by dedicated servers for each of the distinct modalities of the conversation, multipurpose servers, or a combination of servers and endpoints of the communication system.

Computing device 600 may have additional features or functionality. For example, the computing device 600 may also include additional data storage devices (removable and/or non-removable) such as, for example, magnetic disks, optical disks, or tape. Such additional storage is illustrated in FIG. 6 by removable storage 609 and non-removable storage 610. Computer readable storage media may include volatile and nonvolatile, removable and non-removable media implemented in any method or technology for storage of information, such as computer readable instructions, data structures, program modules, or other data. System memory 604, removable storage 609 and non-removable storage 610 are all examples of computer readable storage media. Computer readable storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 600. Any such computer readable storage media may be part of computing device 600. Computing device 600 may also have input device(s) 612 such as keyboard, mouse, pen, voice input device, touch input device, and comparable input devices. Output device(s) 614 such as a display, speakers, printer, and other types of output devices may also be included. These devices are well known in the art and need not be discussed at length here.

Computing device 600 may also contain communication connections 616 that allow the device to communicate with other devices 618, such as over a wireless network in a distributed computing environment, a satellite link, a cellular link, and comparable mechanisms. Other devices 618 may include computer device(s) that execute communication applications, other directory or policy servers, and comparable devices. Communication connection(s) 616 is one example of communication media. Communication media can include therein computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

Example embodiments also include methods. These methods can be implemented in any number of ways, including the structures described in this document. One such way is by machine operations, of devices of the type described in this document.

Another optional way is for one or more of the individual operations of the methods to be performed in conjunction with one or more human operators performing some. These human operators need not be collocated with each other, but each can be only with a machine that performs a portion of the program.

Figure 7:
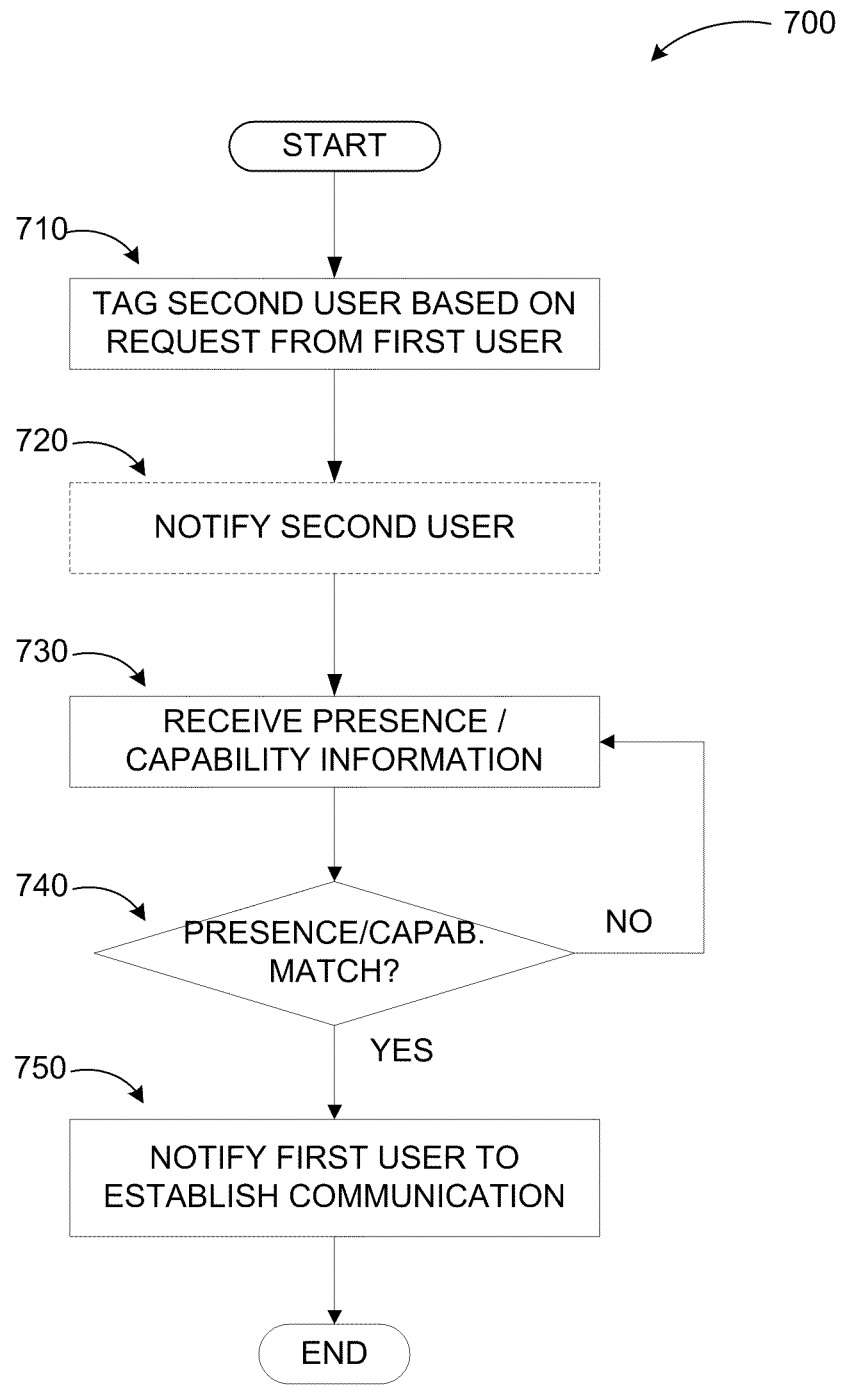
FIG. 7 illustrates a logic flow diagram for callback tagging in an enhanced communication system according to embodiments.

FIG. 7 illustrates a logic flow diagram of process 700 for implementing callback tagging in an enhanced communication system according to embodiments. Process 700 may be implemented as part of a communication system that facilitates multiple communication modes.

Process 700 begins with operation 710, where a user is tagged based on a request from another user. The requesting user may define one or more criteria specifying desired presence status for the tagged (and optionally the tagging) user and desired communication modalities. The desired communication modalities may be accommodated by one or more end devices (and applications) employed by the tagged user, some of which may not be active at the time of tagging.

At optional operation 720, the tagged user may be notified. This notification may enable the tagged user to take action such as activate inactive devices, cut short an existing communication session, modify their presence status, and so on.

At operation 730, presence and capability information about the tagged user is received. This information may be received directly from the tagged user's endpoint(s) or from dedicated servers such as a presence server, a communication server, and comparable ones.

At decision operation 740, a determination is made whether the presence status and communication capabilities of the tagged user match the desired criteria defined by the tagging user. If there is no match, processing returns to operation 730 where the presence status and communication capabilities of the tagged user (and optionally the tagging user) are continued to be monitored.

If the presence status and communication capabilities of the tagged user are determined to match the criteria defined by the tagging user, processing advances to operation 750, where the tagging user is notified such as that he/she can establish the desired multimodal communication session. According to some embodiments, the session may be established automatically by alerting both users (e.g. sending invite messages).

The operations included in process 700 are for illustration purposes. A communication service with multimodal callback tagging capability may be implemented by similar processes with fewer or additional steps, as well as in different order of operations using the principles described herein.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A method to be executed at least in part in a computing device for facilitating multimodal conversation, the method comprising:
   receiving a request from a first subscriber for tagging a second subscriber to establish a multimodal communication session enabling the first subscriber to communicate with at least the second subscriber over a plurality of devices, applications, and communication modes in one of a simultaneous manner and a sequential manner, wherein the request includes a desired presence state and a set of desired communication capabilities for the second subscriber;
   determining presence attributes of the second subscriber, the presence attributes including a current presence state indicating an availability status, a mobile status, and a location, and a current set of communication capabilities, indicating available end devices and network capabilities of the second subscriber;
   publishing the presence attributes of the second subscriber under presence information associated with the second subscriber taking into account security measures including personal identification numbers, passwords and privacy settings to protect the privacy and security of the multimodal conversation;
   if the current presence state and the current set of communication capabilities of the second subscriber match the desired presence state and the set of desired communication capabilities of the second subscriber, notifying the first subscriber about the match for enabling the first subscriber to plan, establish, and modify communication behavior based on the presence attributes of the second subscriber;
   if the current presence state and the current set of communication capabilities of the second subscriber do not match the desired presence state and the set of desired communication capabilities of the second subscriber, continuing to monitor the current presence state and the current set of communication capabilities of the second subscriber, wherein a presence status information and communication capability information are received from one of the following: a tagged subscriber's endpoints, a presence server, or a communication server; and
   notifying the first subscriber about the match when a match is determined.

2. The method of claim 1, further comprising:
   notifying the second subscriber about the requested multimodal communication session.

3. The method of claim 2, wherein notifying the second subscriber about the requested multimodal communication is based on the second subscriber's presence state.

4. The method of claim 2, wherein the notification to the second subscriber about the requested multimodal communication includes information associated with at least one from a set of: a subject matter of the requested multimodal communication session, a link to a document associated with the requested multimodal communication session, and reference information associated with the requested multimodal communication session.

5. The method of claim 2, wherein the notification includes one of: an electronic mail message, an instant message, a SIP notification, a visual alert, and an audio alert.

6. The method of claim 1, wherein the request from the first subscriber is for tagging a plurality of subscribers to establish the multimodal communication session, and the method further comprises:
   determining a current presence state and the current set of communication capabilities of the plurality of subscribers;
   if the current presence state and the current set of communication capabilities of the plurality of subscribers match the desired presence state and the set of desired communication capabilities of the plurality of subscribers, notifying the first subscriber about the match;
   if the current presence state and the current set of communication capabilities of the plurality of subscribers do not match the desired presence state and the set of desired communication capabilities of the plurality of subscribers, monitoring the current presence state and the current set of communication capabilities of the plurality of subscribers; and
   notifying the first subscriber about the match when a match is determined.

7. The method of claim 1, wherein the multimodal communication session includes at least one from a set of: audio communication, video communication, an application sharing session, a data sharing session, a white boarding session, an electronic mail exchange, and an instant message session.

8. A communication system for facilitating multimodal communication sessions between endpoints of the system, the system comprising:
   a communication server operating a presence based callback tagging module, wherein the presence based callback tagging module is configured to:
      receive a request from a first subscriber for tagging a second subscriber to establish a multimodal communication session enabling the first subscriber to communicate with at least the second subscriber over a plurality of devices, applications, and communication modes in one of a simultaneous manner and sequential manner, wherein the request includes a desired presence state and a set of desired communication capabilities for the second subscriber;
      determine presence attributes of the second subscriber, the presence attributes including a current presence state and a current set of communication capabilities of the second subscriber;
      publish the presence attributes of the second subscriber under presence information associated with the second subscriber taking into account security measures including personal identification numbers, passwords and privacy settings to protect the privacy and security of a multimodal conversation;
      if the current presence state and the current set of communication capabilities of the second subscriber match the desired presence state and the set of desired communication capabilities for the second subscriber, notify the first subscriber about a match; else monitor the current presence state and the current set of communication capabilities of the second subscriber; and enable the first subscriber to provide a notification to the second subscriber that the first subscriber desires to communicate with employing one of an electronic mail exchange application and an instant message application.

9. The system of claim 8, wherein the communication server is further configured to:
upon determining the match, enable the first subscriber to establish the requested multimodal communication session employing the presence based callback tagging module.

10. The system of claim 8, wherein the communication server is further configured to:
upon determining the match, automatically establish the requested multimodal communication session by sending invite messages to the first subscriber and the second subscriber employing the presence based callback tagging module.

11. The system of claim 8, further comprising a presence server configured to provide presence state information associated with the first subscriber and the second subscriber to the communication server.

12. The system of claim 8, wherein the current presence state and the current set of communication capabilities of the second subscriber are monitored and the match determined also by one of: dedicated servers for each of a plurality of distinct modalities of the communication session, multipurpose servers, and a combination of servers and endpoints of the communication system.

13. The system of claim 8, wherein the communication system is implemented as one of: a single network system in an enterprise environment and a multi-network system in a federated environment.

14. A computer-readable storage medium with instructions stored thereon for managing multimodal conversations, the instructions comprising:
receiving a request at a presence based callback tagging module from a first subscriber for tagging a second subscriber to establish a multimodal conversation by enabling the first subscriber to enter the second subscriber into an input text box on a subscriber interface of a communication device associated with the first subscriber, wherein the request includes a criterion defined by the first subscriber based on a desired presence state and a set of desired communication capabilities for the second subscriber;
enabling the first subscriber to provide authentication for requesting to tag the second subscriber by providing a unique identifier associated with the first subscriber;
determining a current presence state and a current set of communication capabilities of the second subscriber;

enabling the second subscriber to provide authentication for initiating establishment of the multimodal conversation by providing a unique identifier associated with the second subscriber;
if the current presence state and the current set of communication capabilities of the second subscriber satisfy the criterion;
enabling establishment of the requested multimodal conversation, wherein
enabling the establishment of the requested multimodal conversation includes one of: notifying the first subscriber based on the second subscriber's presence state by providing callback tagging information in one of a textual and graphic form including one or more of: a second subscriber's identification, a presence status, and available communication capabilities on the subscriber interface of the communication device, taking into account security measures including personal identification numbers, passwords and privacy settings to protect the privacy and security of the multimodal conversation, and automatically establishing the conversation by sending invite messages to the first and the second subscribers,
else
monitoring the current presence state and the current set of communication capabilities of the second subscriber; and
enabling establishment of the requested multimodal conversation when the criterion is satisfied by one of: enabling the first subscriber to select a desired communication capability of the second subscriber from the subscriber interface on the communication device by selecting from available communication capability icons for the second subscriber displayed on the subscriber interface or automatically sending invite messages to the first subscriber and the second subscriber.

15. The computer-readable medium of claim 14, wherein the instructions further comprise:
determining a likelihood of the first subscriber's and the second subscriber's communication capabilities based on their respective presence states;
determining a likelihood of establishing the requested conversation; and
notifying the first subscriber about the likelihood of establishing the requested conversation.

16. The computer-readable medium of claim 14, wherein the first subscriber is enabled to request the multimodal conversation from any of their active communication devices.

17. The computer-readable medium of claim 14, wherein the second subscriber is notified regarding the requested conversation based on their presence state.

* * * * *